United States Patent [19]

Bauer

[11] Patent Number: 5,513,360
[45] Date of Patent: Apr. 30, 1996

[54] COMPUTER MICROPHONE POWERED BY INTERNAL BATTERY OR COMPUTER HARDWARE

[75] Inventor: Robert Bauer, Shirley, Mass.

[73] Assignee: Sun Microsystems, Inc., Mountain View, Calif.

[21] Appl. No.: 262,354

[22] Filed: Jun. 20, 1994

Related U.S. Application Data

[63] Continuation of Ser. No. 842,219, Feb. 26, 1992, abandoned.

[51] Int. Cl.$^6$ .............................. G06F 1/00; H04M 11/00
[52] U.S. Cl. ........................................ 395/750; 455/127
[58] Field of Search .................... 395/750; 381/69.2, 381/111, 168, 191; 455/127

[56] References Cited

U.S. PATENT DOCUMENTS

| | | | |
|---|---|---|---|
| 4,379,988 | 4/1983 | Mattatall | 381/69.2 |
| 4,509,193 | 4/1985 | Carlson | 381/69.2 |
| 4,544,923 | 10/1985 | Blatter et al. | 455/127 |
| 4,567,608 | 1/1986 | Watson et al. | 381/111 |
| 4,625,274 | 11/1986 | Schroeder | 395/750 |
| 4,782,355 | 11/1988 | Sakai et al. | 395/750 |
| 4,922,450 | 5/1990 | Rose et al. | 395/750 |
| 4,989,260 | 1/1991 | Meade | 455/95 |
| 4,992,951 | 2/1991 | Glowczewski et al. | 395/750 |
| 5,033,109 | 7/1991 | Kawano et al. | 455/127 |
| 5,036,532 | 7/1991 | Metroka et al. | 455/127 |
| 5,119,497 | 6/1992 | Freige et al. | 395/750 |
| 5,210,804 | 5/1993 | Schmid | 381/69.2 |
| 5,212,797 | 5/1993 | Miyake et al. | 395/750 |
| 5,264,850 | 11/1993 | Khorram | 381/168 |

*Primary Examiner*—George B. Davis
*Attorney, Agent, or Firm*—Blakely Sokoloff Taylor & Zafman

[57] ABSTRACT

A computer microphone with a dual power source capability is disclosed. This dual power source capability allows the microphone to receive power from an internal power source or an external power source disposed in computer hardware. In the event that the computer microphone is receiving power from the internal power source, and power is thereafter provided from the external source disposed in computer hardware, the present invention provides for the automatic turning off of the internal power source. In related fashion, in the event the computer microphone is receiving power from the external power source disposed in the computer hardware, and that external power source is thereafter turned off, the present invention automatically provides the computer microphone with power from the internal power source.

10 Claims, 3 Drawing Sheets

5,513,360

COMPUTER MICROPHONE POWERED BY INTERNAL BATTERY OR COMPUTER HARDWARE

This is a continuation of patent application Ser. No. 07/842,219 filed Feb. 26, 1992, now abandoned.

BACKGROUND OF THE INVENTION

1. Field of the Invention

The present invention relates to the field of computer input devices, and more particularly to the field of computer microphones.

2. Art Background

Computer systems often employ input devices for inputting information. Such input devices can take any number of forms, including keyboards, card readers, magnetic disk drives, and mouses. One input device, the computer microphone, is receiving increased attention in the field of computer input devices. In recent years, computer systems have realized an ever expanding ability to utilize audio input information. Frequently, audio information is initially provided to the computer system in the form of an analog signal. This analog signal is then converted to a digital signal in an analog-to-digital converter, and this digital signal is then utilized by the computer system. The audio information can be utilized, for example, in the sending of voice messages. Such messages could be inputted into a first computer at a first location, then sent over a computer network to a second location with a second location where the digital signal is reconverted to analog and outputted over a speaker.

As will be described, the present invention provides a computer microphone input device with a dual power source capability. This dual power source capability allows the microphone to receive power from an internal power source or an external power source. The present invention provides for the automatic shutting off or on of the internal power source, in the event the external power source is, respectively, turned on or off.

SUMMARY OF THE INVENTION

A computer microphone with a dual power source capability is disclosed. This dual power source capability allows the microphone to receive power from an internal power source or an external power source disposed in computer hardware. In the event that the computer microphone is receiving power from the internal power source, and power is thereafter provided from the external source disposed in computer hardware, the present invention provides for the automatic turning off of the internal power source. In related fashion, in the event the computer microphone is receiving power from the external power source disposed in the computer hardware, and that external power source is thereafter turned off, the present invention automatically provides the computer microphone with power from the internal power source.

BRIEF DESCRIPTION OF THE DRAWINGS

Further details are explained below with the help of the examples illustrated in the attached drawings in which:

FIG. 2 illustrates exemplary circuitry within a computer system for coupling with the computer microphone of the present invention, the figure depicting a power source from the computer on.

DETAILED DESCRIPTION OF THE INVENTION

A computer microphone capable of receiving its power internally from an internal power source or externally from an external power source located in computer hardware associated with a computer system is described. In the following description, for purposes of explanation, specific elements and values are set forth in order to provide a better understanding of the present invention. It will be appreciated by one skilled in the art, however, that the present invention can be understood and practiced without reference to these specific elements and values.

Figure 1:
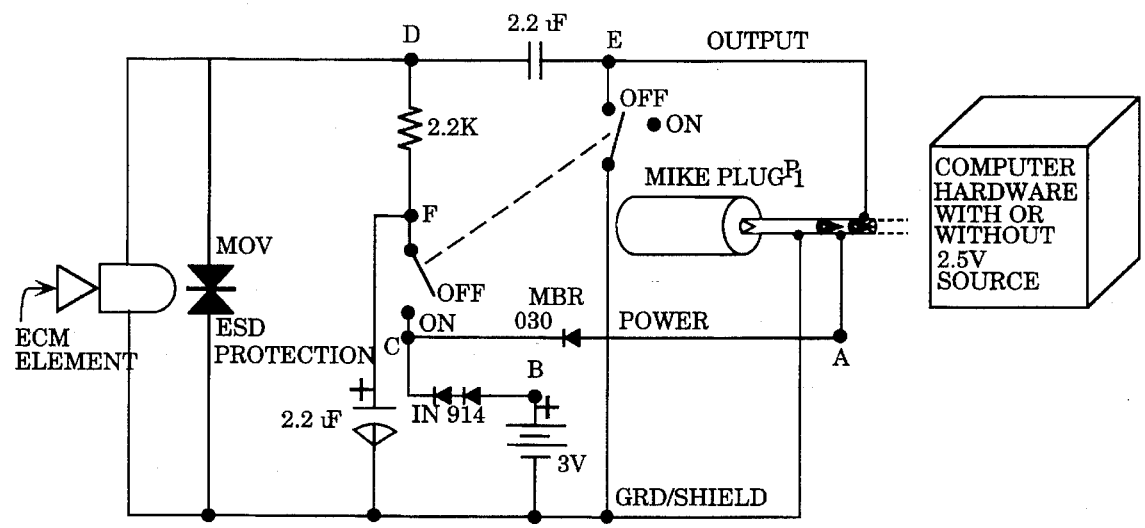
FIG. 1 is a schematic diagram of the present invention.

Referring now to FIG. 1, this figure illustrates a schematic diagram of the computer microphone circuit of the present invention. Sample values and part designations are shown for illustrative purposes only and should not be interpreted in any way or fashion as limitations upon the present invention. As illustrated in this figure, an internal voltage source is coupled between node B and ground. This internal voltage source can take any number of forms, including a battery device. In a presently preferred embodiment of the invention, this voltage source takes the form of a 3 Volt lithium battery. A first diode and a second diode are coupled between node B and node C. It should be noted that two diodes rather than one diode have been chosen here to provide a requisite voltage drop across node B and node C. In principle, assuming voltage values slightly different from those chosen in this embodiment, the present invention will readily function, as desired, with a single diode placed between node B and node C. A single diode is coupled between node A and node C. As further illustrated in this figure, a capacitor is coupled betweeen node F and ground; a resistor is coupled between node F and node D; and a capacitor is coupled between node D and node E. A first switch is coupled between node C and node F, and a second cooperating switch is coupled between node E and ground. It is envisioned that these switches, working in cooperation, can take any number of forms, including switches that are manually opened or closed. In the discussion which follows, it will be assumed that these cooperating switches are in the "on" position.

As shown in FIG. 1, a transducer, an electret condenser element (ECM), is coupled between node D and ground. This transducer translates sound waves into variations in voltages across the element. While the presently preferred embodiment utilizes an electret condenser to perfrom this transducing function, it will be appreciated by those skilled in the art that the present invention can readily be utilized with other transducing elements, including a carbon element, varying its resistance in response to sound waves. An electrostatic discharge device (ESD) can be optionally coupled, as shown in this figure, between node D and ground to discharge static electricity which might be coupled to the electret condenser element (ECM).

It will be appreciated from FIG. 1, that the computer microphone of the present invention is capable of receving power from both an external and an internal voltage source.

As illustrated, a plug (PLUG) couples the computer microphone circuit to computer hardware associated with a computer system. This plug has at least three leads, including an output lead which takes the signal output of the computer microphone at node E and couples this output to the computer hardware, a ground lead coupled to the circuit ground, and significantly, a power lead which accepts and applies an external source of voltage from the computer hardware associated with a computer system to node A.

In operation, the present invention provides for the "turning off" of power from the internal power source in the event that power is received from an external power source disposed in computer hardware. Referring to FIG. 1, assume that power is initially being provided from the internal, 3 Volt voltage source coupled between node B and ground, without any voltage being applied to node A. Assume, however, that therafter, the associated computer system is turned on, and more particularly, that the external power source disposed in computer hardware is turned on. Under such circumstances, a voltage is applied to node A. Assume that the voltage applied at node A is 5 Volts. As a result, there will be a voltage drop across the diode between node A and node C of approximately 0.7 volts. Thus, the voltage at node C will be approximately 4.3 Volts. This level of voltage at node C serves to back-bias the diodes coupled between node C and node B, thereby effectively "turning off" the internal power source.

It will be appreciated from the above scenario, and FIG. 1, that if the external power source is thereafter turned off, the internal power source returns, turning back on. Namely, when the voltage at node A again drops to zero, i.e. the external power source is turned off, the internal power source then provides power anew because the diodes coupled between node B and node C are no longer back-biased. Thus, in this way, the present invention provides for a computer microphone with a dual power capability. The computer microphone is able to initially utilize an internal power source, then shut off the internal power source in favor of an external power source disposed in computer hardware, then return to the internal power source when this external power source is turned off. In addition, as previously described, the present invention can optionally incorporate cooperating switches which disengage both power sources (switch between node C and node F) and simultaneously ground the output (switch between node E and ground).

The above described computer microphone can be coupled to virtually any hardware component in a computer system which has a port adapted to properly receive the three leads of the computer microphone. While the precise point of coupling will depend upon the design of the computer system itself, it is contemplated that the computer microphone of the present invention can be coupled to the computer itself, a mainframe, a motherboard, a monitor, a keyboard, a disk drive, or any hardware associated with the computer system capable of providing an external power source.

Figure 2:
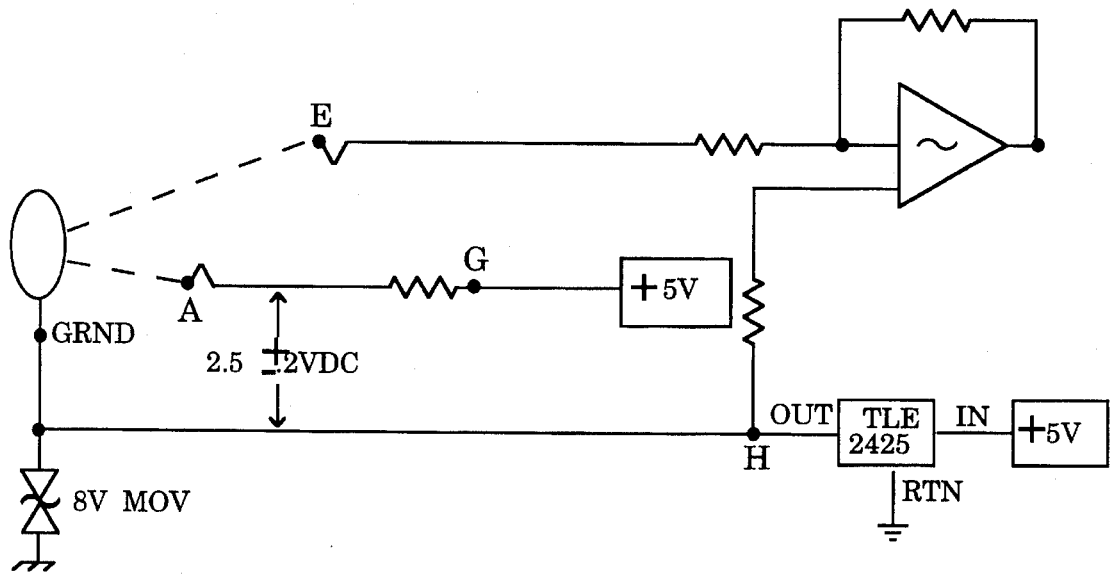
Figure 3:
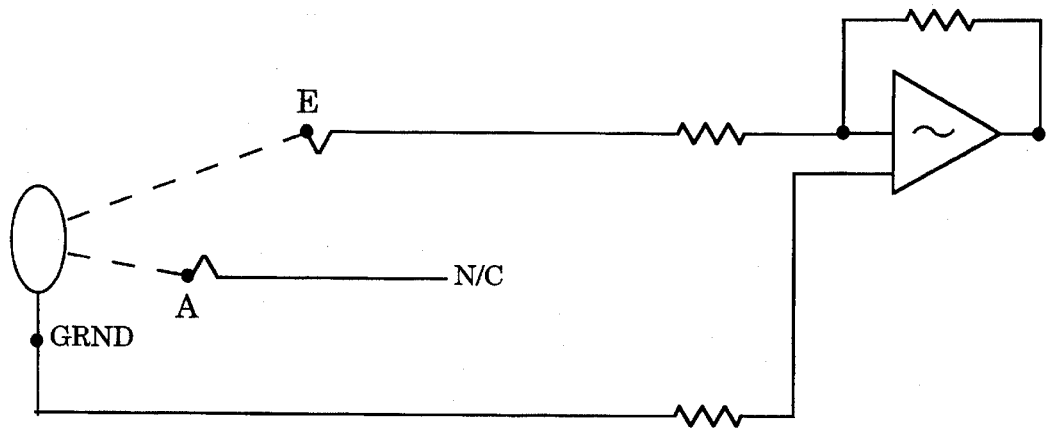
FIG. 3 illustrates exemplary circuitry within a computer system for coupling with the computer microphone of the present invention, the figure depicting the power source from the computer off.

Referring now to FIGS. 2 and 3, these figures illustrate one possible configuration for circuit elements within the computer hardware which provide for an external power source, and accept and amplify the output from the computer microphone. In particular, FIG. 2 illustrates these circuit elements with the external power source on, while FIG. 3 illustrates these circuit elements with the external power source off.

As illustrated in FIG. 2, with the external power source on, 5 volts is provided to node G. A resistor is coupled between node G and node A, and the voltage at node A is therefore, a product of the voltage at node G and the voltage that is dropped across this resistor. The output of the computer microphone is provided to node E and can be amplified for use in the corresponding sample amplifier circuit. The ground lead of the computer microphone is not connected directly to ground in this figure. For various reasons, the ground for a computer typically experiences considerable unwanted noise. Thus, the ground lead of the computer microphone is instead coupled to node H, and a virtual ground IC regulator (TLE 2425) is shown coupled between node H and the 5 volt source. This regulator effectively places node H at 2.5 volts. An electrostatic discharge device (8 V MOV) can be optionally coupled, as shown in this figure, between node H and ground to discharge static electricity which might be coupled to the computer microphone.

As illustrated in FIG. 3, with the external power source off, no voltage is is provided to node A. Under such circumstances, the computer microphone receives power from its internal power source. The output, as before, is provided to node E, and can be amplified for use in the corresponding sample amplifier circuit.

Figure 4:
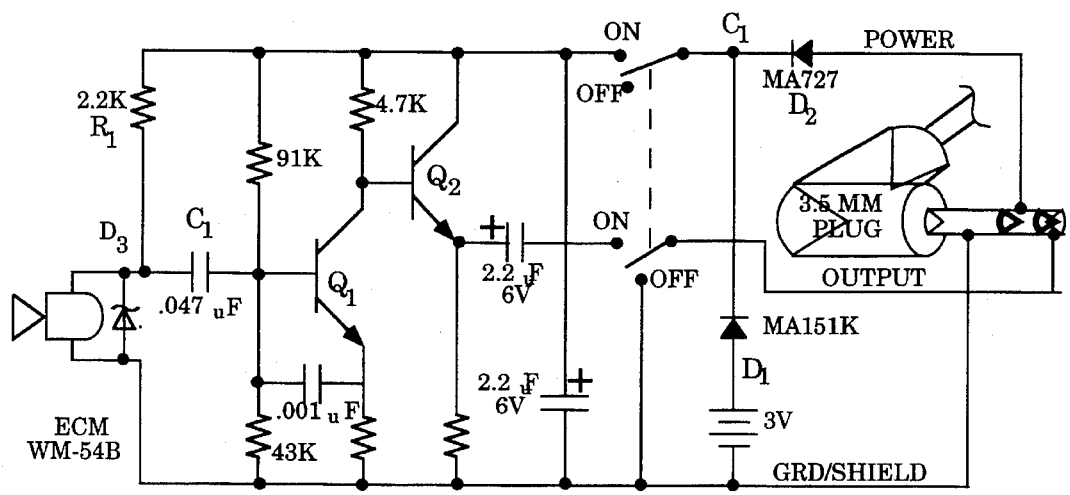
FIG. 4 illustrates a schematic drawing of the present invention with an amplifier provided in the computer microphone.

Referring now to FIG. 4, this figure illustrates an embodiment of the computer microphone of the present invention which provides for internal amplification. Again, sample values and part designations are shown for illustrative purposes only and should not be interpreted in any way or fashion as limitations upon the present invention. The embodiment illustrated in this figure is advantageously used when there is a need for amplification of the output signal prior to the coupling of the output signal to the computer system. As illustrated, this amplifier utilizes two bipolar transistors which offer certain cost advantages. It will be appreciated by one skilled in the art, however, that MOSFET devices could alternatively be utilized in this amplifier circuit. The embodiment illustrated in FIG. 4, it will be noted, illustrates the alternative utilization of a single diode between the internal power source and node $C_1$.

While the present invention has been particularly described with reference to FIGS. 1 through 4, and with emphasis on certain circuit components and component values, it should be understood that the figures are for illustration only and should not be taken as limitations upon the invention. References to certain values, and the absence of specific, exhaustive references to each and every possible value should not be taken as an expression of any limitation upon the present invention. It is further contemplated that many changes and modifications may be made, by one of ordinary skill in the art, without departing from the spirit and scope of the invention as disclosed herein.

I claim:

1. A computer microphone circuit for coupling to a computer comprising:

means for generating an electrical signal, wherein said means for generating an electrical signal accepts a sound wave as an input and generates an electrical signal as an output;

first means for supplying a first voltage to said means for generating an electrical signal, said first voltage being at the output of a first diode in series with an internal power source; and second means for supplying a second voltage to said means for generating an electrical signal, said second voltage being at the output of a second diode in series with an external power source, said second voltage being greater than said first voltage, wherein when the application of power from said external power source is supplied to the computer microphone circuit, the application of power from said internal power source is terminated and, wherein when the application of power from said external power source is terminated, the application of power from said internal power source is re-initiated.

2. The computer microphone circuit as set forth in claim 1 further comprising:

transducer means.

3. The computer microphone circuit as set forth in claim 2 wherein said transducer means comprises an electret condenser whose capacitance varies based on characteristics of sound waves input into said transducer means.

4. The computer microphone circuit as set forth in claim 3 wherein said transducer means further comprises a carbon element whose resistance varies based on characteristics of sound waves input into said transducer means.

5. The computer microphone circuit as set forth in claim 3 further comprising switch means for coupling and uncoupling said internal power source and said external power source from the computer microphone circuit.

6. The computer microphone circuit as set forth in claim 1 wherein said first diode comprises of two diodes connected in series from said internal power source.

7. The computer microphone circuit as set forth in claim 1 wherein said external power source is located within the computer system.

8. A method for providing a microphonic capability to a computer system, the method comprising the steps of:

supplying a first voltage to a computer microphone circuit, said first voltage being at the output of a first diode in series with an internal power source, said internal power source being located within said computer microphone circuit;

supplying a second voltage to said computer microphone circuit, said second voltage being at the output of a second diode in series with an external power source, external to said computer microphone circuit, said second voltage being greater than said first voltage;

terminating the application of power from said internal power source; and re-initiating the application of power from said internal power source when the application of power from said external power source is terminated.

9. The method of claim 8 wherein said external power source is located within the computer system.

10. The method of claim 8 wherein said first diode is comprised of two diodes connected in series from said internal power source.

* * * * *